(12) United States Patent
Rieken et al.

(10) Patent No.: US 12,562,580 B2
(45) Date of Patent: Feb. 24, 2026

(54) SYSTEM AND METHOD OF LINEAR STATE ESTIMATION OF A DISTRIBUTION NETWORK FROM SYNCHRONOUS SMART METER AND LINE SENSOR

(71) Applicant: Aclara Technologies LLC, St. Louis, MO (US)

(72) Inventors: David William Rieken, O'Fallon, MO (US); Lakshan Prageeth Piyasinghe, St. Charles, MO (US); Roger Alan Smith, Gibsonia, PA (US); Glenn Anthony Emelko, Mentor, OH (US)

(73) Assignee: Aclara Technologies LLC, St. Louis, MO (US)

( * ) Notice: Subject to any disclaimer, the term of this patent is extended or adjusted under 35 U.S.C. 154(b) by 383 days.

(21) Appl. No.: 18/137,301

(22) Filed: Apr. 20, 2023

(65) Prior Publication Data

US 2023/0344241 A1 Oct. 26, 2023

Related U.S. Application Data

(60) Provisional application No. 63/333,940, filed on Apr. 22, 2022.

(51) Int. Cl.
*H02J 3/44* (2006.01)
*H02J 13/00* (2006.01)

(52) U.S. Cl.
CPC .......... *H02J 3/44* (2013.01); *H02J 13/00002* (2020.01); *H02J 2203/20* (2020.01)

(58) Field of Classification Search
CPC ..... H02J 3/44; H02J 13/00002; H02J 2203/20
See application file for complete search history.

(56) References Cited

U.S. PATENT DOCUMENTS

| | | | | |
|---|---|---|---|---|
| 2011/0307109 A1* | 12/2011 | Sri-Jayantha | .......... | G06Q 10/04 |
| | | | | 700/291 |
| 2013/0158734 A1* | 6/2013 | Jhang | ....................... | G01D 1/18 |
| | | | | 700/292 |

(Continued)

OTHER PUBLICATIONS

PCT/US2023/019285 International Search Report and Written Opinion dated Jul. 25, 2023 (12 pages).

(Continued)

*Primary Examiner* — Ziaul Karim
(74) *Attorney, Agent, or Firm* — Michael Best & Friedrich LLP

(57) ABSTRACT

A system for determining a linear state estimation of a power distribution network. The system includes a plurality of metering devices, a plurality of power sources, each of the plurality of power sources coupled to a respective metering device, and a plurality of collection devices, each of the plurality of collection devices in electronic communication with a respective metering device. The plurality of collection devices measure an Advanced Metering Infrastructure (AMI) dataset and calculate a phase angle of the power source coupled to the metering device. The system includes a host device in electronic communication with the plurality of collection devices. An electronic processor of the host device receives the AMI dataset and the phase angle of the plurality of metering devices, determines the linear state estimation of the power distribution network based on the phase angle and the AMI dataset, and identifies information associated with the power distribution network.

20 Claims, 7 Drawing Sheets

(56) References Cited

U.S. PATENT DOCUMENTS

| | | | |
|---|---|---|---|
| 2014/0265574 A1* | 9/2014 | Tyler | H02J 3/38 |
| | | | 307/31 |
| 2014/0277796 A1* | 9/2014 | Peskin | H02J 13/00034 |
| | | | 700/291 |
| 2016/0274606 A1* | 9/2016 | Sun | G06N 5/02 |
| 2018/0031617 A1* | 2/2018 | Rieken | G01R 21/133 |
| 2018/0262010 A1* | 9/2018 | Kato | H02J 3/00 |
| 2018/0292447 A1 | 10/2018 | Piyasinghe et al. | |
| 2020/0106301 A1* | 4/2020 | Hong | H02J 13/00002 |
| 2021/0172986 A1 | 6/2021 | Rieken et al. | |

OTHER PUBLICATIONS

Haughton et al., "A linear State Estimation Formulation for Smart Distribution Systems" in IEEE Transactions on Power Systems, vol. 28, No. 2, pp. 1187-1195, May 2013.

* cited by examiner

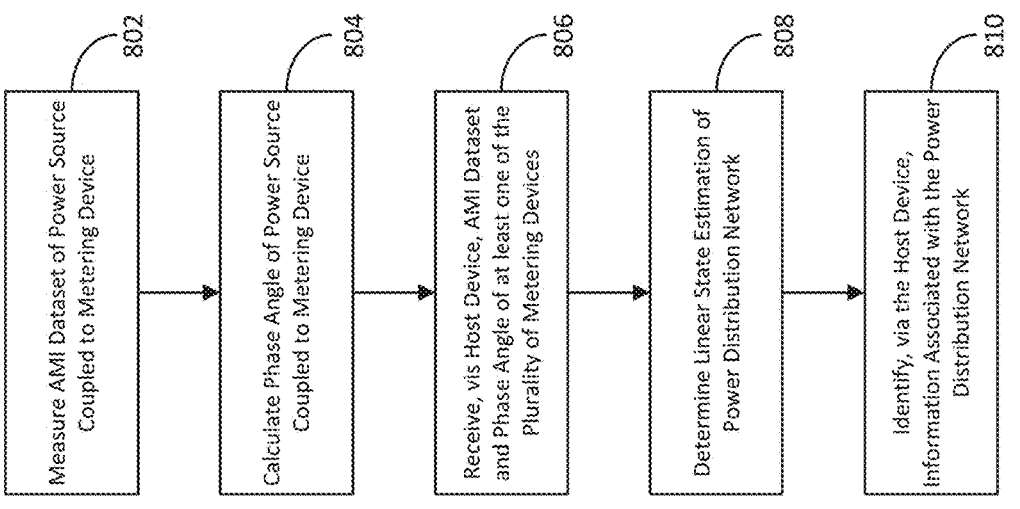

Measure AMI Dataset of Power Source Coupled to Metering Device — 802

Calculate Phase Angle of Power Source Coupled to Metering Device — 804

Receive, vis Host Device, AMI Dataset and Phase Angle of at least one of the Plurality of Metering Devices — 806

Determine Linear State Estimation of Power Distribution Network — 808

Identify, via the Host Device, Information Associated with the Power Distribution Network — 810

SYSTEM AND METHOD OF LINEAR STATE ESTIMATION OF A DISTRIBUTION NETWORK FROM SYNCHRONOUS SMART METER AND LINE SENSOR

RELATED APPLICATIONS

This application claims priority to U.S. Provisional Patent Application No. 63/333,940, filed on Apr. 22, 2022, the entire contents of which are incorporated herein by reference.

FIELD

The embodiments disclosed herein relate to wireless synchronization systems and methods for determining linear state estimation of power distribution networks.

SUMMARY

Conventional phasor measurement units (PMUs) may use wired connections such as power line communication (PLC) to communicate between phasor measurement devices and the data recorders. Typically, a synchronization signal may be communicated from the data recorders to the phasor measurement devices, which may then transmit a signal back via the PLC system to allow for relative phases to be calculated. However, this can result in a heavy burden being placed on the communication network. Further, it may be difficult to determine the flow of power within a power distribution network using this conventional communication network.

Thus, the disclosure provides, in one aspect, a system for determining a linear state estimation of a power distribution network. The system includes a plurality of metering devices and a plurality of power sources. Each one of the plurality of power sources is coupled to a respective metering device of the plurality of metering devices. The system also includes a plurality of collection devices. Each one of the plurality of collection devices is in electronic communication with a respective metering device of the plurality of metering devices. The plurality of collection devices measure an Advanced Metering Infrastructure (AMI) dataset and calculate a phase angle of the power source coupled to the metering device. The system also includes a host device in electronic communication with the plurality of collection devices. The host device includes a memory and an electronic processor. The electronic processor receives the AMI dataset and the phase angle of at least one of the plurality of metering devices, determines the linear state estimation of the power distribution network based on the phase angle and the AMI dataset, and based on determining the linear state estimation, identifies information associated with the power distribution network.

In some aspects, the AMI dataset and the phase angle of each of the plurality of power sources are associated with a first time.

In some aspects, the first time is the synchronous time that the AMI dataset is measured and the phase angle is calculated for each of the plurality of power sources.

In some aspects, the linear state estimation is determined based on the AMI dataset and the phase angle of each of the plurality of collection devices associated with the first time.

In some aspects, the plurality of collection devices measure the AMI dataset and calculate the phase angle of each of the plurality of power sources at a second time.

In some aspects, a second linear state estimation is determined based on the AMI dataset and the phase angle of each of the plurality of collection devices associated with the second time.

In some aspects, the AMI dataset includes at least one of a voltage measurement, a current measurement, or a power factor.

In some aspects, the host device receives a circuit map of the power distribution network and determines, based on the linear state estimation of the power distribution network and the circuit map, information associated with the power distribution network.

In some aspects, the host device calculates a complex voltage value of at least one of the plurality of metering devices and based on the identified information and the complex voltage value, determines a power flow, a line loss localization, a failing component, a high impedance fault, or a theft detection of the power distribution network.

In some aspects, the host device is a server based computing system.

The disclosure provides, in another aspect, a method for determining a linear state estimation of a power distribution network. The power distribution network includes a plurality of metering devices and a plurality of power sources. Each one of the plurality of power sources is coupled to a respective metering device of the plurality of metering devices. The power distribution network also includes a plurality of collection devices. Each of the plurality of collection devices is in electronic communication with a respective metering device of the plurality of metering devices. The power distribution network also includes a host device in electronic communication with the plurality of collection devices, the host device including a memory and an electronic processor. The method includes measuring, via the plurality of collection devices, an Advanced Metering Infrastructure (AMI) dataset of the power source coupled to the metering device, calculating, via the plurality of collection devices, a phase angle of the power source coupled to the metering device, and receiving, via the host device, the AMI dataset and the phase angle of at least one of the plurality of metering devices. The method also includes determining, via the host device, the linear state estimation of the power distribution network based on the phase angle and the AMI dataset and identifying, via the host device, information associated with the power distribution network based on the linear state estimation.

In some aspects, the AMI dataset and the phase angle of each of the plurality of power sources are associated with a first time.

In some aspects, the first time is the synchronous time that the AMI dataset is measured and the phase angle is calculated for each of the plurality of power sources.

In some aspects, the linear state estimation is determined based on the AMI dataset and the phase angle of each of the plurality of collection devices associated with the first time.

In some aspects, the plurality of collection devices measure the AMI dataset and calculate the phase angle of each of the plurality of power sources at a second time.

In some aspects, a second linear state estimation is determined based on the AMI dataset and the phase angle of each of the plurality of collection devices associated with the second time.

In some aspects, the AMI dataset includes at least one of a voltage measurement, a current measurement, or a power factor.

In some aspects, the method includes receiving, via the host device, a circuit map of the power distribution network and determining, via the host device, based on the linear state estimation of the power distribution network and the circuit map, information associated with the power distribution network.

In some aspects, the method includes calculating a complex voltage value of at least one of the plurality of metering devices and determining, via the host device, a power flow, a line loss localization, a failing component, a high impedance fault, or a theft detection of the power distribution network based on the identified information and the complex voltage value.

In some aspects, the host device is a server based computing system.

Other aspects of the technology will become apparent by consideration of the detailed description and accompanying drawings.

BRIEF DESCRIPTION OF THE DRAWINGS

FIG. 8 is a flow chart illustrating a method for determining a linear state estimation at a central host computing device, according to some embodiments.

DETAILED DESCRIPTION

Before any embodiments of the application are explained in detail, it is to be understood that the application is not limited in its application to the details of construction and the arrangement of components set forth in the following description or illustrated in the following drawings. For ease of description, some or all of the example systems presented herein are illustrated with a single exemplar of each of its component parts. Some examples may not describe or illustrate all components of the systems. Other exemplary embodiments may include more or fewer of each of the illustrated components, may combine some components, or may include additional or alternative components. The application is capable of other embodiments and of being practiced or of being carried out in various ways.

Figure 1:
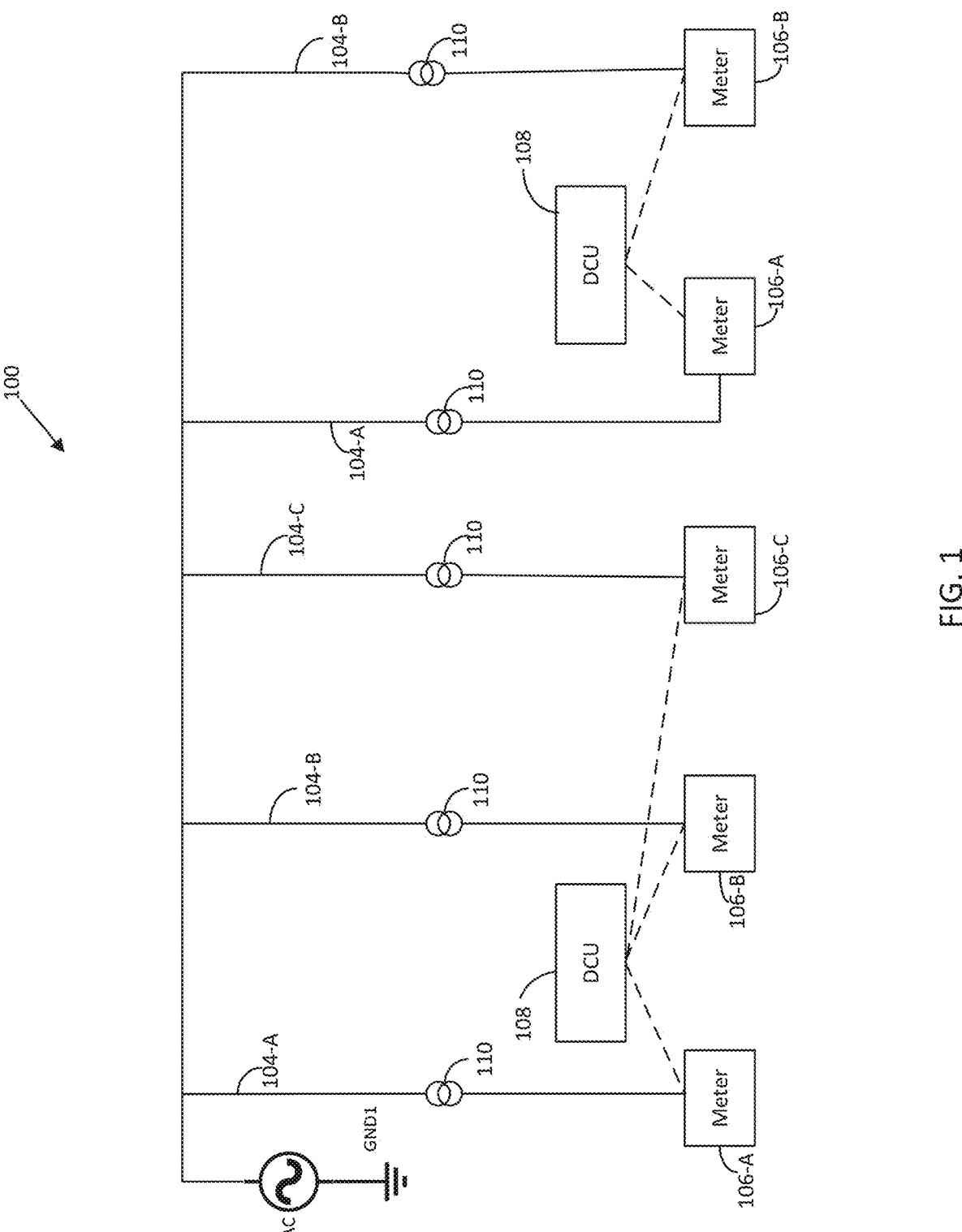
FIG. 1 is a block diagram illustrating a phasor measurement system according to some embodiments.

FIG. 1 illustrates an example synchronized phasor (i.e., synchrophasor) measurement system 100, in accordance with some embodiments. The synchronized phasor measurement system 100 includes a power distribution network 104 and metering devices 106. The system 100 may further include one or more data collection units ("DCU") 108. The metering devices 106 may be mechanically, electrically, and/or communicatively connected to aspects of the power distribution network 104. As illustrated in FIG. 1, the metering devices 106 may be connected to transformers 110 (e.g., distribution transformers that step down medium-voltage to low-voltage). The metering devices 106 may be residential metering devices, commercial metering devices, industrial metering devices, etc. The DCUs 108 may be wirelessly connected to the metering devices 106 to facilitate communication between the DCUs 108 and the metering devices 106. For example, a DCU 108 may be connected to one or more metering devices 106 using one or more wireless protocols, such as cellular (e.g. 3G, 4G, LTE, CDMA, etc.), RF, or other applicable wireless protocols. In other embodiments, the DCU 108 may be connected to one or more metering devices 106 via a wired connection.

In one embodiment, the power distribution network 104 includes distribution lines each adapted to carry electric power having different wiring phases. For example, a distribution line 104-A may be adapted to carry electric power having Phase A to one or more metering devices 106-A, a distribution line 104-B may be adapted to carry electric power having Phase B to one or more metering devices 106-B, and a distribution line 104-C may be adapted to carry electric power having Phase C to one or more metering devices 106-C. In one exemplary embodiment, distribution lines of the power distribution network 104 may carry electric power having a combination of Phase A, Phase B, and/or Phase C to metering devices 106-C. For example, when the system includes delta-Y and/or Y-delta transformers the phases of the outputs of these transformers will not be pure Phase A, Phase B, or Phase C, but instead may be a combination of Phase A, Phase B, and/or Phase C.

The metering devices 106 may be placed on the power distribution network 104 wherever synchronous phasor measurements are to be made. In some embodiments, the metering devices 106 may include a collection device capable of wirelessly communicating with one or more DCUs 108. In some embodiments, the DCUs 108 are placed at multiple locations within the system 100 to facilitate communication with the metering devices 106 as needed. In some embodiments, the DCUs 108 may be located every 5-10 miles to ensure communication with the metering devices 106. In some examples, the DCUs 108 may be mounted to power line poles at specified intervals to ensure proper coverage.

Figure 2:
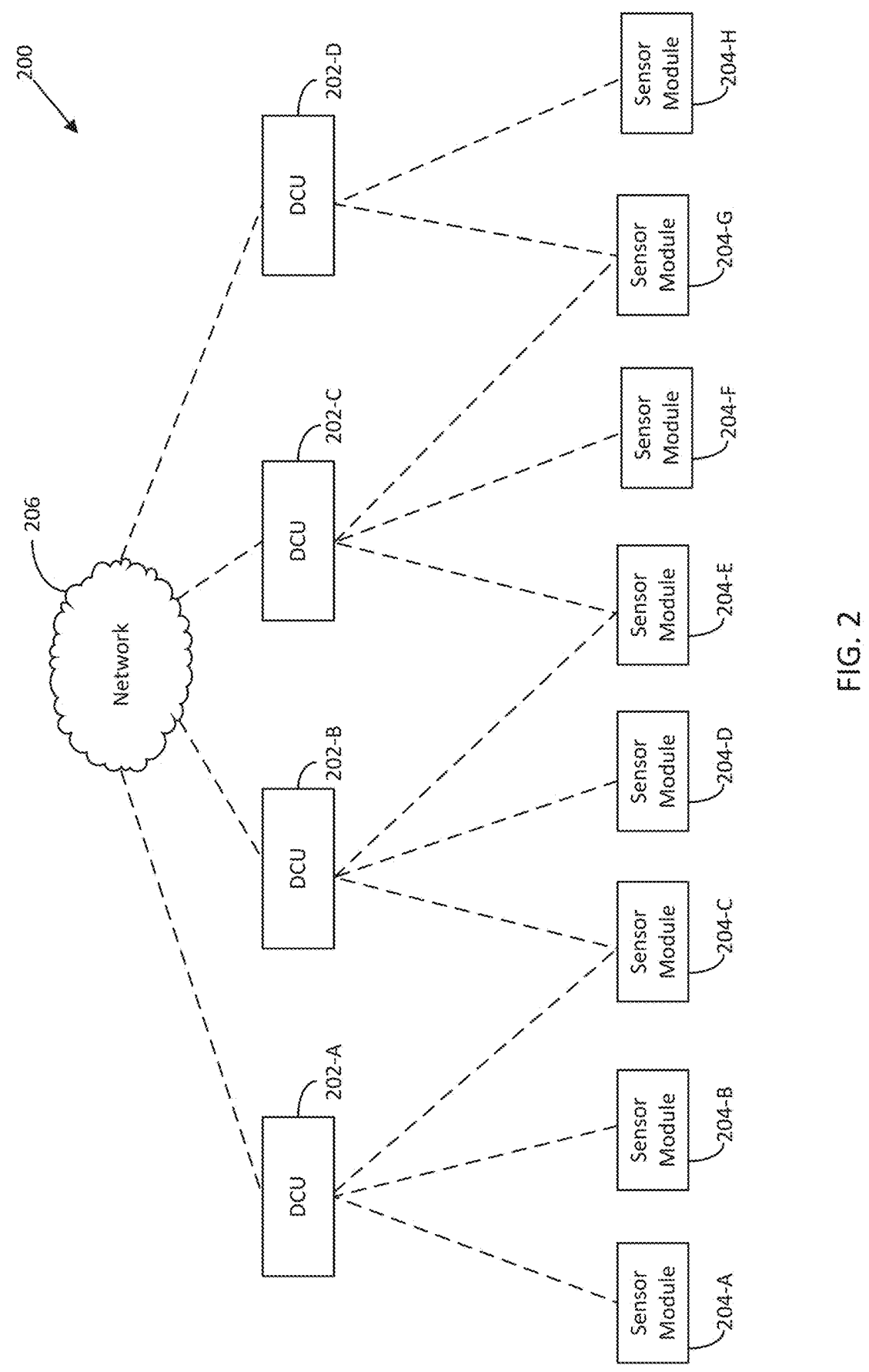
FIG. 2 is a system diagram illustrating a phasor measurement system according to some embodiments.

Turning now to FIG. 2, a network diagram of a power distribution equipment communication network 200 is shown, according to some embodiments. As shown in FIG. 2 a number of DCUs 202 are shown to be in communication with a number of sensor modules 204. In one embodiment, the DCUs 202 are similar to the DCUs 108, described above. The sensor modules 204 may be configured to receive a communication from the DCUs 202 and subsequently transmit a return message to the DCU 202, as will be described in more detail below. It is understood that the term sensor modules can be used interchangeably with the term collection device, as used herein. In one embodiment, the sensor modules 204 are coupled to a meter, such as meters 106 described above. The sensor modules 204 may be configured to determine phase data and/or other waveform data via the coupled meters (not shown). While the sensor modules 204 are generally described as being coupled to meters, it is contemplated that the sensor modules 204 may be integrated into the meters.

As shown in FIG. 2, the DCUs 202 are also shown as in communication with a network 206. The network 206 may be a cloud-based or Internet-based network. However, other network types, such as local area networks (LAN), are also contemplated. In one embodiment, the DCUs 202 are in wireless communication with the network 206. However, in some embodiments, the DCUs 202 communicate with the network 206 via a wired connection, as will be described in more detail below. In one embodiment, the network 206 is configured to be a data storage network. In other embodiments, the network 206 is configured to perform one or more functions, such as determining one or more reference phasor values and/or phasor differences across the distribution system.

As further shown in FIG. 2, each DCU 202 may be in communication with one or more sensor modules 204. Furthermore, a single sensor module 204 may be in communication with one or more DCUs 202. For example, sensor module 204-C may be in communication with both DCU 202-A and DCU 202-B; sensor module 204-E may be in communication with both DCU 202-B and DCU 202-C; and sensor module 204-G may be in communication with DCU 202-C and 202-D. In one embodiment, the DCUs 202 and the sensor modules 204 communicate via a radio frequency (RF) communication protocol, although other wireless communication protocols are also considered. The messages sent between the DCUs 202 and the sensor modules 204 may be sent as general broadcasts using the RF communication protocol such that they may be received by any DCU 202 and/or sensor module 204 within range. Thus, different sensor modules 204 may communicate with different DCUs 202 based on various conditions affecting the RF signal, such as distance, weather, obstructions, atmospheric conditions, etc.

Figure 3:
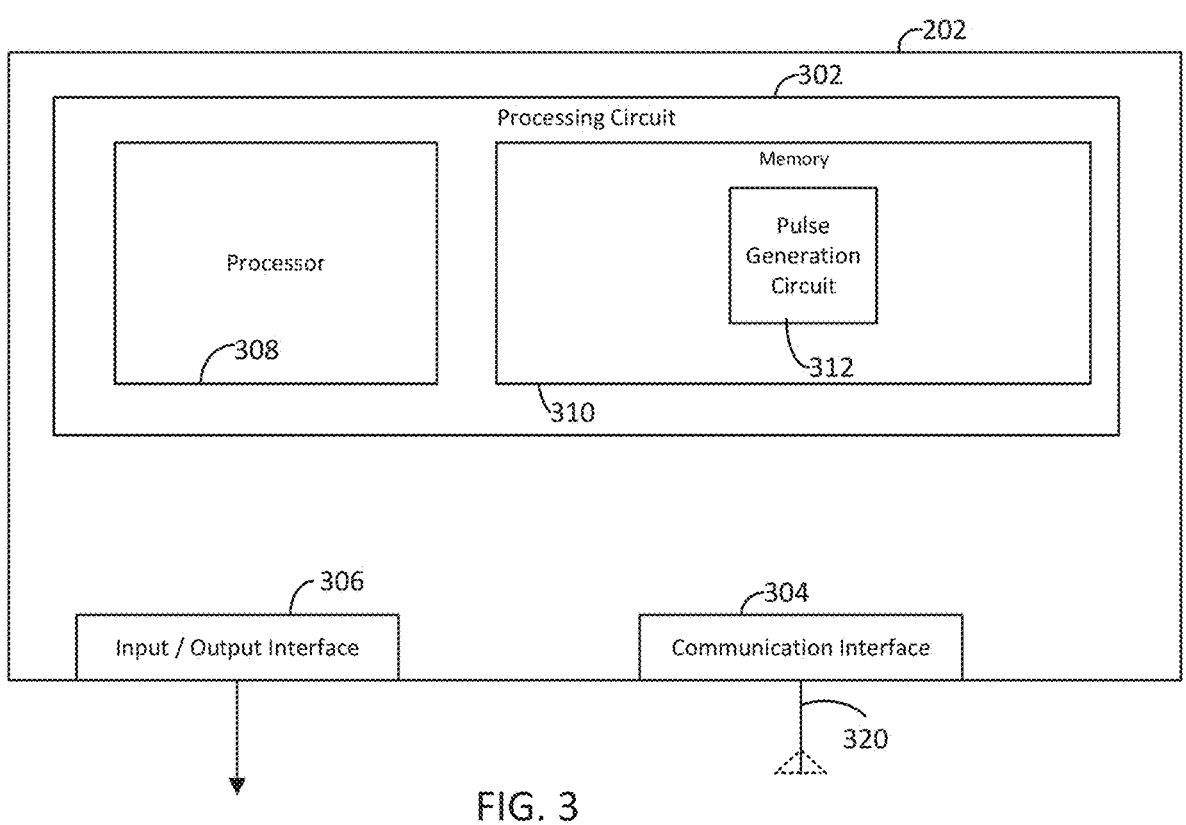
FIG. 3 is a block diagram illustrating the synchronizer devices of FIGS. 1 and 2, according to some embodiments.

Turning now to FIG. 3, a block diagram of a DCU 202 is shown, according to some embodiments. The DCU 202 may be a standalone device, or may be a part of one or more devices, such as power meters 106, switchgear, etc. As shown in FIG. 3, the DCU 202 includes a processing circuit 302, a communication interface 304, an input/output (I/O) interface 306, and a transceiver 320. The processing circuit 302 includes an electronic processor 308 and a memory 310. The processing circuit 302 may be communicably connected to one or more of the communication interface 304 and the I/O interface 306. The electronic processor 308 may be implemented as a programmable microprocessor, an application specific integrated circuit (ASIC), one or more field programmable gate arrays (FPGA), a group of processing components, or with other suitable electronic processing components.

The memory 310 (for example, a non-transitory, computer-readable medium) may include one or more devices (for example, RAM, ROM, flash memory, hard disk storage, etc.) for storing data and/or computer code for completing or facilitating the various processes, layers, and modules described herein. The memory 310 may include database components, object code components, script components, or other types of code and information for supporting the various activities and information structure described in the present application. According to one example, the memory 310 is communicably connected to the electronic processor 308 via the processing circuit 302 and may include computer code for executing (for example, by the processing circuit 302 and/or the electronic processor 308) one or more processes described herein.

The communication interface 304 is configured to facilitate communication between the DCU 202 and one or more external devices or systems, such as the sensor modules 204 or the network 206. The communication interface 304 may be, or include, wireless communication interfaces (for example, antennas, transmitters, receivers, transceivers 320, etc.) for conducting data communications between the DCU 202 and one or more external devices, such as the sensor modules 204 and/or the network 206. In some embodiments, the communication interface 304 utilizes a proprietary protocol for communicating with the sensor modules 204 and/or network 206. For example, the proprietary protocol may be an RF-based protocol configured to provide efficient and effective communication between the DCU 202 and other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol.

The I/O module 306 may be configured to interface directly with one or more devices, such as a power supply, a power monitor, etc. In one embodiment, the I/O module may utilize general purpose I/O (GPIO) ports, analog inputs, digital inputs, etc.

As described above, the memory 310 may be configured to store various processes, layers, and modules, which may be executed by the electronic processor 308 and/or the processing circuit 302. In one embodiment, the memory 310 includes a pulse generation circuit 312. The pulse generation circuit 312 is adapted to generate a synchronization pulse for establishing a common time reference between DCU 202 and one or more sensor modules 204. In one embodiment, the synchronization pulse is transmitted via the communication interface 304, such as via the wireless communication protocols described above.

Figure 4:
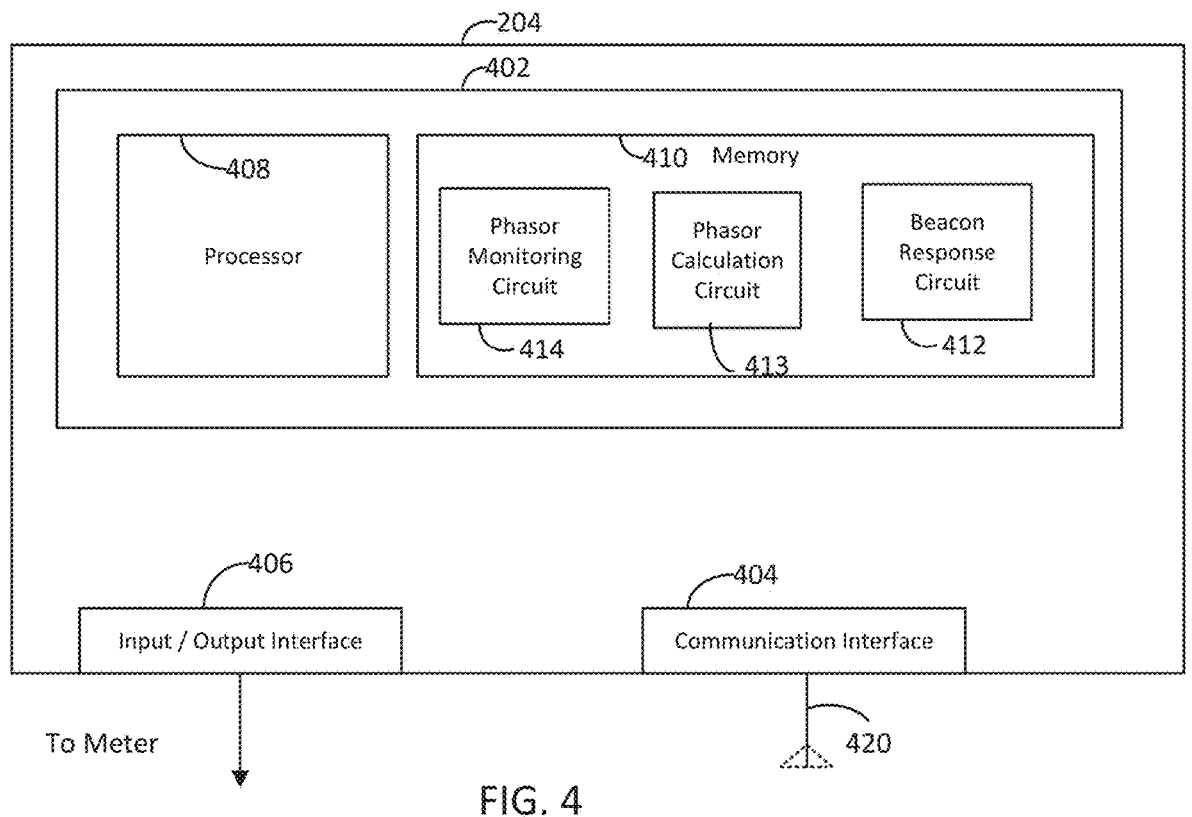
FIG. 4 is a block diagram illustrating the sensor module devices of FIGS. 1 and 2, according to some embodiments.

Turning now to FIG. 4, a block diagram of a sensor module 204 is shown, according to some embodiments. The sensor module 204 may be a standalone device, or may be a part of one or more devices, such as a power meter. As shown in FIG. 4, the sensor module 204 includes a processing circuit 402, a communication interface 404, an input/output (I/O) interface 406, and a transceiver 420. The processing circuit 402 includes an electronic processor 408 and a memory 410. The processing circuit 402 may be communicably connected to one or more of the communication interface 404 and the I/O interface 406. The electronic processor 408 may be implemented as a programmable microprocessor, an application specific integrated circuit (ASIC), one or more field programmable gate arrays (FPGA), a group of processing components, or with other suitable electronic processing components.

The memory 410 (for example, a non-transitory, computer-readable medium) may include one or more devices (for example, RAM, ROM, flash memory, hard disk storage, etc.) for storing data and/or computer code for completing or facilitating the various processes, layers, and modules described herein. The memory 410 may include database components, object code components, script components, or other types of code and information for supporting the various activities and information structure described in the present application. According to one example, the memory 410 is communicably connected to the electronic processor 408 via the processing circuit 402 and may include computer code for executing (for example, by the processing circuit 402 and/or the electronic processor 408) one or more processes described herein.

The communication interface 404 is configured to facilitate communication between the sensor module 204 and one or more external devices or systems, such as the DCUs 202. The communication interface 404 may be, or include, wireless communication interfaces (for example, antennas, transmitters, receivers, transceivers 420, etc.) for conducting data communications between the sensor module 204 and one or more external devices, such as the DCUs 202. In some embodiments, the communication interface 404 utilizes a proprietary protocol for communicating with the DCUs 202.

For example, the proprietary protocol may be an RF-based protocol configured to provide efficient and effective communication between the DCUs 202 or other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol.

The I/O interface 406 may be configured to interface directly with one or more devices, such as a power supply, a meter, etc. In one embodiment, the I/O interface 406 may utilize general purpose I/O (GPIO) ports, analog inputs, digital inputs, etc.

As described above, the memory 410 may be configured to store various processes, layers, and modules, which may be executed by the electronic processor 408 and/or the processing circuit 402. In one embodiment, the memory 410 (or the sensor module 204 in general) includes a beacon response circuit 412. The beacon response circuit 412 is adapted to generate a response beacon for providing a response to an interrogation beacon from one or more DCUs 202. As described in more detail below, the beacon response may receive a time stamp of when an interrogation beacon was received. The beacon response may further include a phase of a sinusoid, such as a reference sinusoid, at the time the interrogation beacon was received. In one embodiment, the response beacon is transmitted using the communication interface 404, such as via the wireless communication protocols described above. The memory 410 (or the sensor module 204 in general) may further include a phasor calculation circuit 413. The phasor calculation circuit 413 may be configured to determine various phasor data of the distribution network, such as a reference phasor as well as variations in phasors across the distribution network, as will be described in more detail below.

The memory 410 (or the sensor module 204 in general) further includes a phase monitoring circuit 414. The phase monitoring circuit 414 may be configured to determine a phase at a meter associated with the sensor module 204, as will be described in more detail below.

Figure 5:
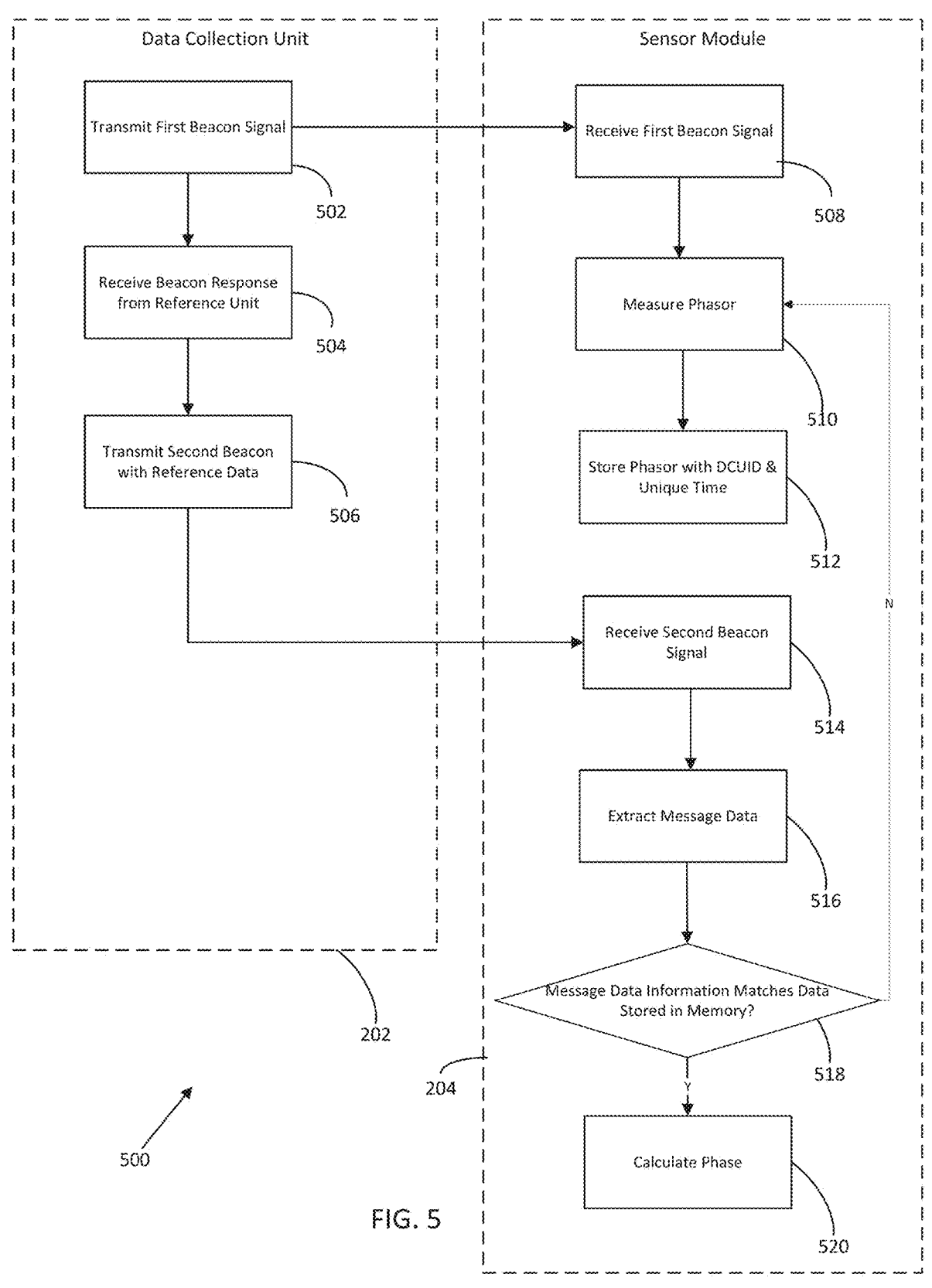
FIG. 5 is a flow chart illustrating a method for determining phase information at a collection device, according to some embodiments.

FIG. 5 illustrates a method 500 of the power distribution network 104 for determining phasor data, according to some embodiments. It should be understood that the order of the steps disclosed in method 500 could vary. Although illustrated as occurring in parallel order, in other embodiments, the steps disclosed may be performed in serial order. Furthermore, additional steps may be added to the process and not all of the steps may be required.

Turning now to FIG. 5, the method 500 for determining phasor data across a distribution network 104 at the metering devices 106 is shown, according to some embodiments. Determining phasor data across a distribution network may allow for the integrity of the distribution network to be verified or validated and may provide an indication when there are issues on the distribution network, which could indicate a risk of power loss on the network. Further, by determining phasor data across the distribution network, a loading of each phase (e.g. A, B, C) on the network may be evaluated to determine if there are imbalances in the loading of the distribution network. Also, by determining phasor data across the network, other system issues, such as failing system components, failing transformers, failing cables, floating neutrals, and other conditions may be detected and tracked. Additionally, the information provided to the utility by the phasor data can allow for more precise control of network components, such as capacitor banks, voltage regulators, and distribution of automation across a smart grid.

In one embodiment, the method 500 is performed by a combination of DCUs, such as the DCUs 202 and a sensor module, such as sensor module 204. However, in other embodiments, the method 500 may be performed via other components within the distribution network. Further, it is contemplated that the method 500 may be performed by multiple DCUs 202 within the distribution system.

At step 502, the DCU 202 transmits a first beacon signal that is received by one or more sensor modules 204. At step 504, the DCU 202 receives a beacon response from a reference unit. In one embodiment, a reference unit is a device (e.g. meter/sensor module) that has a known phase. In some embodiments, the phase may be noted during installation of the reference unit, and a flag or other identifier may be set within the reference unit such that it can broadcast the phase it is connected to when transmitting data. In some embodiments, there may be many different reference devices throughout a power network, such that each of the phases (A, B, C) has multiple associated reference devices. Upon receiving the beacon response from at least one reference unit, the DCU 202 then transmits a second beacon containing the received reference data from the reference unit.

In some embodiments, the reference unit may be determined via an algorithm executed by a central computer, such as network 206. In this approach, a small sample of the total number of sensor modules 204 that received the first beacon signal may transmit their measured phasors back to the DCU 202. The DCU 202 may then send the received phasors to the network 206. The network 206 may then use one or more algorithms to determine what the phase angle may be at, at an ideal unit (which may not actually exist) that is attached to a nominal phase. This determined value may then be used as the reference data for transmission in the second beacon. In one example, the network 206 may transmit the reference data to the DCU 202 for use in generating the second beacon, as described above.

At step 508, a sensor module 204 receives the first beacon. It is understood that multiple sensor modules 204 may receive the first beacon, and therefore each sensor module 204 that receives the subsequent signal may be understood to perform the following functions. Upon receiving the first beacon the sensor module 204 measures a phasor at that instant at step 510. At step 512, the sensor module 204 stores the measured phasor in the memory of the sensor module 204, along with the time the beacon signal was received and an identification value of the DCU that transmitted the first beacon signal.

The sensor module 204 then receives the second beacon containing the reference data at step 514. Upon receiving the second beacon signal, the sensor module 204 extracts message data from the second beacon signal (if any) at step 516. Extracted message data may include reference data, time associated with the reference data (e.g. time reference data was measured), identification (ID) of the DCU transmitting the message, etc. Upon extracting the message data, the sensor module 204 determines whether the message data information corresponds to data stored in the memory of the sensor module 204, at step 518. For example, the sensor module 204 may determine if the time and ID of the DCU in the message match the time and ID of the DCU associated with the first beacon signal received by the sensor module 204 at step 508.

In response to determining that the message received in the second beacon signal included the same time and DCU ID of a previous beacon (e.g. the first beacon signal), the sensor module 204 calculates a phase of the power line connected to the sensor module 204 and/or a meter associated with the sensor module 204 at step 520. In one embodiment, the sensor module 204 calculates the phase by subtracting the reference phasor received in the second beacon from the phasor measured by the sensor module 204 at the time the first beacon was received in step 508 to determine a phase angle difference. Accordingly, the sensor module 204 compares the phasor measured upon receipt of the first beacon signal and stored in the memory 310 of the sensor module 204, with the reference phasor that was measured at the same time. This functionality may be necessary as a sensor module 204 may be in communication with one or more DCUs within the network, as illustrated above. Thus, by comparing the reference phasor only with data associated with the sensor module 204 receiving the same beacon signal as the reference device, it is ensured that the sensor module 204 is comparing similar data. The sensor module 204 may then determine the phase (e.g. the phase the connector is coupled to) in response to the difference between the reference phasor and the measured phasor being determined to be less than a predetermined value. For example, the predetermined value may be a phase angle difference of plus-or-minus 30 degrees. However, phase angle differences of less than plus-or-minus 30 degrees or greater than plus-or-minus 30 degrees are also contemplated. Additionally, in some examples, other predetermined values may be used other than phase angle difference values. In response to determining that the message received in the second beacon signal does not include a time and DCU ID of a previously received beacon, the sensor module 204 will simply disregard the message, and return to step 510.

In some embodiments, the sensor module 204 may transmit the determine phase data to one of more DCUs 202. In other embodiments, the sensor modules 204 may provide the data to one or more other devices, such as a network system, such as network 206.

Figure 6:
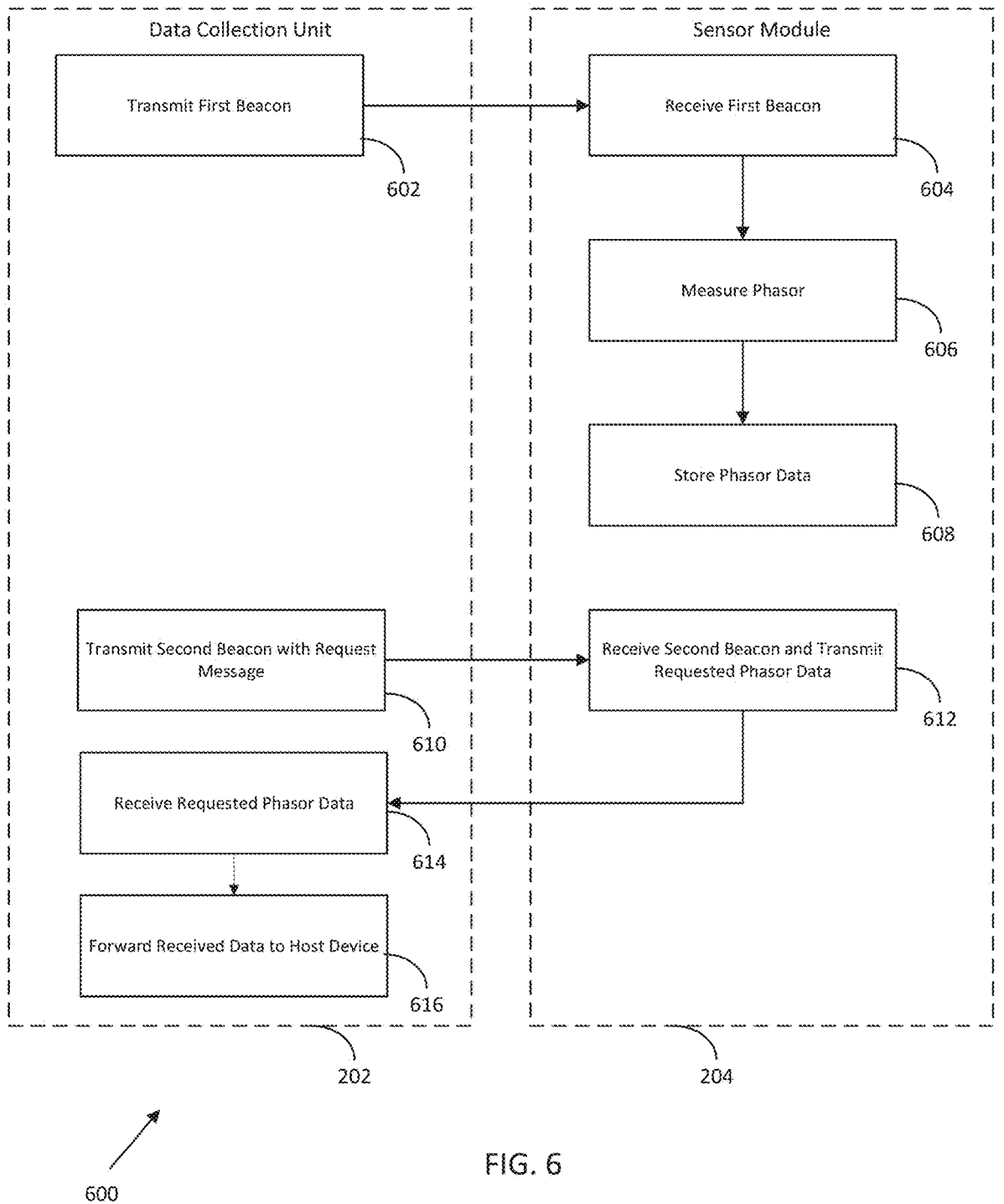
FIG. 6 is a flow chart illustrating a method for determining phase information for a collection device at a central host computing device, according to some embodiments.

FIG. 6 illustrates a method 600 of the power distribution network 104 for determining phase information, according to some embodiments. It should be understood that the order of the steps disclosed in method 600 could vary. Although illustrated as occurring in parallel order, in other embodiments, the steps disclosed may be performed in serial order. Furthermore, additional steps may be added to the process and not all of the steps may be required.

Turning now to FIG. 6, the method 600 for determining phase information of one or more metering devices 106 at a network 206 is shown, according to some embodiments. In contrast to the process 500 described above, process 600 utilizes a centralized computing system, such as a server or cloud-based system (e.g. network 206), to determine the phase of a given metering device as opposed to the metering device and/or sensor module associated with the metering device performing the determination.

At step 602, a DCU 202 transmits a first beacon that is received by one or more sensor modules 204. At step 604, a sensor module 204 receives the first beacon. It is understood that multiple sensor modules 204 may receive the first beacon. Upon receiving the first beacon the sensor module 204 measures a phasor at that instant at step 606. At step 608, the sensor module 204 stores the measured phasor in the memory 310 of the sensor module 204, along with the time the beacon signal was received and an identification value of the DCU that transmitted the first beacon signal.

At step 610 the DCU 202 transmits a second beacon including a request to the sensor modules 204. In one embodiment, the request is an instruction to provide stored phasor data associated with a previously transmitted beacon, such as the first beacon. In other embodiments, the request may request phasor data associated with a DCU ID and a time, wherein the DCU ID and time correspond to a previously transmitted beacon, such as the first beacon. The sensor module 204 receives the beacon at step 612 and transmits the requested phasor data if available. For example, the sensor module 204 may determine if the time and DCU ID in the request match the time and DCU ID associated with the first beacon (or any other previously received beacons) received by the sensor module 204. In response to determining that the sensor module 204 has no stored phasor data corresponding to the time and DCU ID in the request, the sensor module 204 may ignore the request. In other examples, the sensor module 204 may transmit a response to the DCU that the sensor module 204 does not have any stored phasor data corresponding to the time and DCU ID in the request.

At step 614, the DCU 202 receives the requested phasor data from one or more sensor modules 204. In one embodiment, the requested phasor data further includes the time the phasor was measured, as well as an identification of the transmitting sensor module 204. The DCU 202 then forwards the received phasor data to a host device (e.g. server or cloud-based computing system), which then determines a phase for each of the sensor modules 204 that transmitted the phasor data. For example, the host device may use a similar method to determine a phase of the sensor module 204 using reference data, as described above. However, in other embodiments, the host device may use other methods to determine phase data for the sensor modules 204. In some embodiments, the host device may compare the phasor data provided to previous phasor data from the sensor modules 204 to determine if there is an issue or a change indicating a fault or problem in the power distribution network.

Figure 7:
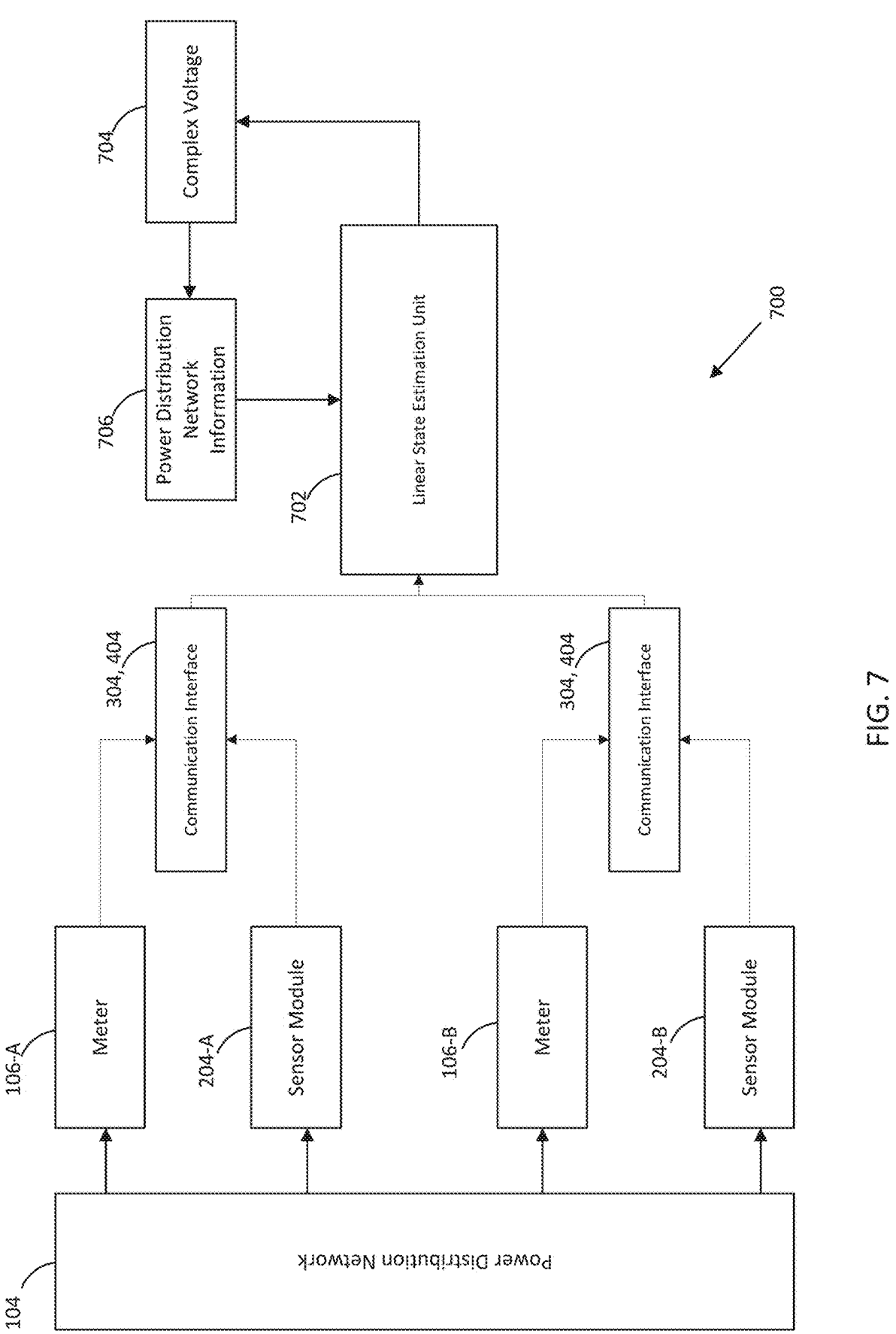
FIG. 7 is a block diagram illustrating a linear state estimation system of the power distribution network of FIGS. 1 and 2, according to some embodiments.

Turning now to FIG. 7, a block diagram of a linear state estimation system 700 of the power distribution network 104 is shown, according to some embodiments. Determining the linear state estimation of a power distribution network may produce more analytic capabilities. Further, by determining the linear state estimation of the power distribution system, complex voltage values may then be calculated at every bus within a power distribution network. The complex voltage values may be used to calculate power flow throughout a power distribution network. Determining the flow of power throughout a power distribution network may ensure that a sufficient amount of power is supplied to existing loads placed upon the power distribution network without violating the power distribution network design. In some embodiments, circuit map topology variables or impedance variables may be determined based on the linear state estimation of the power distribution network. Additionally, the complex voltage values and circuit map topology variables or impedance variables may be used in secondary calculations to provide actionable information to the utility, as described in further detail below.

The linear state estimation system 700 may include the power distribution network 104 as described above in regard to FIGS. 1 and 2. The power distribution network 104 may be in communication with the metering devices 106 and the sensor modules 204. It is understood that the metering devices 106 and the sensor modules 204 include the components as described above. For example, the DCUs 202 are in wireless communication with a number of sensor modules 204. It is understood that the term sensor modules can be used interchangeably with the term collection device, as used herein. In one embodiment, the sensor modules 204 are coupled to a meter, such as meters 106 described above.

While the sensor modules 204 are generally described as being coupled to meters, it is contemplated that the sensor modules 204 may be integrated into the meters.

In some embodiments, the sensor modules 204, or DCUs 202, determine a phasor value (e.g., phase angle) of the metering devices 106 of the power distribution network 104 according to the processes described with regard to FIGS. 5 and 6 above. In some embodiments, the sensor modules 204 and the metering devices 106 may include a global positioning system (GPS) unit for establishing a common time reference between DCU 202 and one or more sensor modules 204. The GPS unit may automatically generate a time stamp when the phasor measurements are taken for ease of time synchronization. Although referenced as GPS unit based time stamp generation, in some embodiments, any method of generating a time stamp for the measured phasor data may be used. The sensor modules 204 may be further configured to measure Advanced Metering Infrastructure (AMI) data of the metering devices 106. In some embodiments, the measured AMI data may include a voltage measurement, a current measurement, and a power factor measurement of the metering devices 106.

As described above, the sensor modules 204 and metering devices 106 may be in communication with the communication interface 304, 404. Although shown as a separate interface in FIG. 7, the communication interface 304,404 may be included in the sensor modules 204 and metering devices 106 as described in some embodiments above. The communication interface 304, 404 may be configured to facilitate communication between the sensor module 204 and one or more external devices or systems, such as linear state estimation unit 702. The communication interface 304, 404 may be, or include, wireless communication interfaces (for example, antennas, transmitters, receivers, transceivers 320,420, etc.) for conducting data communications between the sensor module 204 and one or more external devices, such as the linear state estimation unit 702. In some embodiments, the communication interface 304, 404 utilizes a proprietary protocol for communicating with the linear state estimation unit 702. For example, the proprietary protocol may be an RF-based protocol configured to provide efficient and effective communication between the DCUs 202 or other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol.

The communication interface 304, 404 may be in communication with the linear state estimation unit 702. Although shown as a standalone unit in FIG. 7, the linear state estimation unit 702 may be included as a part of the network 206 (e.g., a host device, server or cloud-based computing system). The linear state estimation unit 702 may further include a memory and a processor. The memory (for example, a non-transitory, computer-readable medium) may include one or more devices (for example, RAM, ROM, flash memory, hard disk storage, etc.) for storing data and/or computer code for completing or facilitating the various processes, layers, and modules described herein. The memory may include database components, object code components, script components, or other types of code and information for supporting the various activities and information structure described in the present application. According to one example, the memory is communicably connected to the electronic processor via the processing circuit and may include computer code for executing (for example, by the processing circuit and/or the electronic processor) one or more processes described herein.

The linear state estimation unit 702 may receive the phase data and AMI data from the sensor modules 204 via the communication interface 304, 404. In response to receiving the phase data and AMI data from the sensor modules 204, the linear state estimation unit 702 may determine a linear state estimation of the power distribution network 104. In some embodiments, the linear state estimation may be determined based on a linear equation plot utilizing the voltage measurements, current measurements, and power factor measurements of the AMI data and the phase angle data. In other embodiments, the linear state estimation may be determined using a Kalman filter method, a weighted-least-square method, or any other method for determining a linear state estimation. In some embodiments, the linear state estimation may be repeated as many times and as frequently as necessary for the power distribution network. In some embodiments, linear state estimation occurs as fast as 120 times per second. In other embodiments, the linear state estimation may be determined at any time and as fast as the phasor measurement system allows.

Based on the determined linear state estimation, the network 206 (e.g., host device) may determine a complex voltage value 704 at each metering device 106. The network 206 may perform additional calculations to identify information 706 associated with the power distribution network 104 based on the complex voltage value 704 at each of the metering devices 106. In some embodiments, the identified information 706 may be used as a reference for a second or subsequent linear state estimation based on the AMI dataset and the phase angle of each of the metering devices 106 associated with a second or subsequent time. In some embodiments, the identified information 706 may include a power flow, a line loss localization, a failing component, a high impedance fault, and/or a theft detection of the power distribution network 104. The power flow of the power distribution network 104 may indicate the forward and reverse and real and reactive power flow at each metering device 106. The line loss localization of the power distribution network 104 may indicate the real and reactive power dissipated at every metering device 106. A failing component may be detected by determining a higher than expected impedance or an excessive power dissipation based on the identified information 706. The high impedance fault of the power distribution network 104 may indicate any sources or sinks of real and reactive power on the power distribution network 104. The position of those sources or sinks may indicate the presence of high impedance faults that have not been isolated. The theft detection of the power distribution network 104 may indicate sources or sinks of real and reactive power lying at unidentified endpoints of a circuit topology map that may indicate the presence of unmetered loads.

In other embodiments, the linear state estimation unit 702 may receive a circuit map including the topology and known impedances of the metering devices of the power distribution network 104. The network 206 may identify information 706 associated with the power distribution network 104 based on the linear state estimation of the power distribution network 104 and the received circuit map. The received circuit map may allow for the network 206 to identify information 706 associated with each individual metering device 106 of the power distribution network 104 with greater accuracy. The network 206 may associate the topology of the power distribution network 104 with the known impedances of the metering devices 106 to identify information 706 relative to each individual metering device 106 in the power distribution network 104.

FIG. 8 illustrates a method 800 of the power distribution system 100 for determining a linear state estimation, according to some embodiments. It should be understood that the order of the steps disclosed in method 800 could vary. Although illustrated as occurring in parallel order, in other embodiments, the steps disclosed may be performed in serial order. Furthermore, additional steps may be added to the process and not all of the steps may be required.

Turning now to FIG. 8, the method 800 for determining a linear state estimation of the power distribution network 104 is shown, according to some embodiments. The process 800 may utilize a centralized computing system, such as a server or cloud-based system (e.g. network 206), to determine the linear state estimation of the power distribution network 104 and identify information associated with the power distribution network.

At step 802, a sensor module 204 may measure Advanced Metering Infrastructure (AMI) data of the metering devices 106. In some embodiments, the measured AMI data may include a voltage measurement, a current measurement, and/or a power factor measurement of the metering devices 106. In one embodiment, the sensor modules 204 may be coupled to a meter, such as meters 106 described above. While the sensor modules 204 are generally described as being coupled to meters, it is contemplated that the sensor modules 204 may be integrated into the meters. At step 804, the sensor module 204, or DCU 202, may calculate a phasor value (e.g., phase angle) of the metering devices 106 of the power distribution network 104. In some embodiments, the sensor modules 204, or DCUs 202, may determine a phasor value (e.g., phase angle) of the metering devices 106 of the power distribution network 104 according to the methods described with regard to FIGS. 5 and 6 above.

At step 806, a host device (e.g., a linear state estimation unit 702 within a network 206) may receive the phase angle data and AMI data for at least one of the metering devices 106 via a communication interface 304, 404 connected to the sensor module 204. At step 808, the linear state estimation unit 702 of the host device may determine a linear state estimation of the power distribution network based on the received phase angle data and the AMI data. In some embodiments, the linear state estimation may be determined based on a linear equation plot utilizing the voltage measurements, current measurements, and power factor measurements of the AMI data and the phase angle data. At step 810, the network 206 may identify information associated with the power distribution network based on the linear state estimation.

In some embodiments, the identified information at step 810 may be used as a reference for a second or subsequent linear state estimation based on the AMI dataset and the phase angle of each of the metering devices 106 associated with a second or subsequent time. In some embodiments, the identified information at step 810 may include a power flow, a line loss localization, a failing component, a high impedance fault, and/or a theft detection of the power distribution network 104. The power flow of the power distribution network 104 may indicate the forward and reverse and real and reactive power flow at each metering device 106. The line loss localization of the power distribution network 104 may indicate the real and reactive power dissipated at every metering device 106. A failing component may be detected by determining a higher than expected impedance or an excessive power dissipation based on the identified information 706. The high impedance fault of the power distribution network 104 may indicate any sources or sinks of real and reactive power on the power distribution network 104. The position of the sources or sinks may indicate the presence of high impedance faults that have not been isolated. The theft detection of the power distribution network 104 may indicate sources or sinks of real and reactive power lying at unidentified endpoints of a circuit topology map that may indicate the presence of unmetered loads.

In some embodiments, step 810 may further include that the network 206 (e.g., host device) may determine a complex voltage value at each metering device 106. The network 206 may perform additional calculations to identify the information associated with the power distribution network 104 based on the complex voltage value at each of the metering devices 106.

In other embodiments, step 808 may further include that the linear state estimation unit 702 may receive a circuit map including the topology and known impedances of the metering devices of the power distribution network 104. The network 206 may identify information associated with the power distribution network 104 based on the linear state estimation of the power distribution network 104 and the received circuit map. The received circuit map may allow for the network 206 to identify information associated with each individual metering device 106 of the power distribution network 104 with greater accuracy. The network 206 may associate the topology of the power distribution network 104 with the known impedances of the metering devices 106 to identify information relative to each individual metering device 106 in the power distribution network 104.

Thus, the application provides, among other things, a system and method of linear state estimation of a power distribution network. Various features and advantages of the application are set forth in the following claims.

What is claimed is:

1. A system for determining a linear state estimation of a power distribution network, the system comprising:
   a plurality of metering devices;
   a plurality of power sources, wherein each one of the plurality of power sources is coupled to a respective metering device of the plurality of metering devices;
   a plurality of collection devices, wherein each of the plurality of collection devices is in electronic communication with a respective metering device of the plurality of metering devices,
   wherein the plurality of collection devices are configured to measure an Advanced Metering Infrastructure (AMI) dataset and calculate a phase angle of the power source coupled to the metering device; and
   a host device in electronic communication with the plurality of collection devices, the host device including a memory and an electronic processor, wherein the electronic processor is configured to:
   receive the AMI dataset and the phase angle of at least one of the plurality of metering devices,
   determine the linear state estimation of the power distribution network based on the phase angle and the AMI dataset, and
   based on determining the linear state estimation, identify information associated with the power distribution network.

2. The system of claim 1, wherein the AMI dataset and the phase angle of each of the plurality of power sources are associated with a first time.

3. The system of claim 2, wherein the first time is a synchronous time that the AMI dataset is measured and the phase angle is calculated for each of the plurality of power sources.

4. The system of claim 3, wherein the linear state estimation is determined based on the AMI dataset and the phase angle of each of the plurality of collection devices associated with the first time.

5. The system of claim 4, wherein the plurality of collection devices are further configured to measure the AMI dataset and calculate the phase angle of each of the plurality of power sources at a second time.

6. The system of claim 5, wherein a second linear state estimation is determined based on the AMI dataset and the phase angle of each of the plurality of collection devices associated with the second time.

7. The system of claim 1, wherein the AMI dataset includes at least one of a voltage measurement, a current measurement, or a power factor.

8. The system of claim 1, wherein the host device is further configured to:

receive a circuit map of the power distribution network; and determine, based on the linear state estimation of the power distribution network and the circuit map, information associated with the power distribution network.

9. The system of claim 1, wherein the host device is further configured to:

calculate a complex voltage value of at least one of the plurality of metering devices; and based on the identified information and the complex voltage value, determine a power flow, a line loss localization, a failing component, a high impedance fault, or a theft detection of the power distribution network.

10. The system of claim 1, wherein the host device is a server based computing system.

11. A method for determining a linear state estimation of a power distribution network, wherein the power distribution network includes a plurality of metering devices; a plurality of power sources, wherein each one of the plurality of power sources is coupled to a respective metering device of the plurality of metering devices; a plurality of collection devices, wherein each of the plurality of collection devices is in electronic communication with a respective metering device of the plurality of metering devices; and a host device in electronic communication with the plurality of collection devices, the host device including a memory and an electronic processor, the method comprising:

measuring, via the plurality of collection devices, an Advanced Metering Infrastructure (AMI) dataset of the power source coupled to the metering device;

calculating, via the plurality of collection devices, a phase angle of the power source coupled to the metering device;

receiving, via the host device, the AMI dataset and the phase angle of at least one of the plurality of metering devices;

determining, via the host device, the linear state estimation of the power distribution network based on the phase angle and the AMI dataset; and identifying, via the host device, information associated with the power distribution network based on the linear state estimation.

12. The method of claim 11, wherein the AMI dataset and the phase angle of each of the plurality of power sources are associated with a first time.

13. The method of claim 12, wherein the first time is a synchronous time that the AMI dataset is measured and the phase angle is calculated for each of the plurality of power sources.

14. The method of claim 12, wherein the linear state estimation is determined based on the AMI dataset and the phase angle of each of the plurality of collection devices associated with the first time.

15. The method of claim 13, wherein the plurality of collection devices are further configured to measure the AMI dataset and calculate the phase angle of each of the plurality of power sources at a second time.

16. The method of claim 15, wherein a second linear state estimation is determined based on the AMI dataset and the phase angle of each of the plurality of collection devices associated with the second time.

17. The method of claim 11, wherein the AMI dataset includes at least one of a voltage measurement, a current measurement, or a power factor.

18. The method of claim 11, wherein the method further comprises:

receiving, via the host device, a circuit map of the power distribution network; and determining, via the host device, based on the linear state estimation of the power distribution network and the circuit map, information associated with the power distribution network.

19. The method of claim 11, wherein the method further comprises:

calculating a complex voltage value of at least one of the plurality of metering devices; and determining, via the host device, a power flow, a line loss localization, a failing component, a high impedance fault, or a theft detection of the power distribution network based on the identified information and the complex voltage value.

20. The method of claim 11, wherein the host device is a server based computing system.

* * * * *